United States Patent [19]

Schulze et al.

[11] 4,256,869

[45] Mar. 17, 1981

[54] POLYURETHANES FROM TRANS-CYCLOHEXANE-1,4-DIISOCYANATE

[75] Inventors: Helmut Schulze, Aschaffenburg; Hans Zengel, Kleinwallstadt; Walter Brodowski, Amorbach, all of Fed. Rep. of Germany; Franciscus J. Huntjens, Arnheim; Jan A. J. Schutijser, Dieren, both of Netherlands; Peter Hentschel, Laudenbach, Fed. Rep. of Germany

[73] Assignee: Akzo N.V., Arnheim, Netherlands

[21] Appl. No.: 52,981

[22] Filed: Jun. 28, 1979

[30] Foreign Application Priority Data

Jul. 3, 1978 [DE] Fed. Rep. of Germany ....... 2829199

[51] Int. Cl.$^3$ ............................................. C08G 18/75
[52] U.S. Cl. ........................................ 528/67; 528/83
[58] Field of Search ..................................... 528/67, 83

[56] References Cited

U.S. PATENT DOCUMENTS 4,119,613   10/1978   Reischl et al. ........................ 528/83

OTHER PUBLICATIONS

Kozhevov et al., Chem. Abstr. 77, 35027f, 1972.
Roberts et al., Basic Principles of Organic Chemistry, W. A. Benjamin, Inc., N. Y., 1964, pp. 115–117.

*Primary Examiner*—Maurice J. Welsh
*Attorney, Agent, or Firm*—Michael J. Striker

[57] ABSTRACT

Polyurethanes prepared from macrodiols with an average molecular weight between about 800 and 4000, lower molecular weight chain extenders with at least two labile hydrogens, and cyclohexane-1,4-diisocyanate with a trans-isomer content of at least 90%, are described. These polyurethanes exhibit exceptional mechanical properties, high softening temperatures, and remarkable stability to light and to many common solvents.

Methods for preparation of the novel polyurethanes, as well as for their use, are also disclosed.

29 Claims, No Drawings

POLYURETHANES FROM TRANS-CYCLOHEXANE-1,4-DIISOCYANATE

BACKGROUND OF THE INVENTION

The invention concerns polyurethanes prepared through the use of cyclohexane-1,4-diisocyanate with a high content of the trans-isomer as well as methods for their preparation and use.

Polyurethanes have been recognized for a long time as highly useful substances in the manufacture of fibers and films as well as in the production of molded bodies; their suitability for use in impregnation and in coating treatments is also well-known in the art. The preparation of polyurethanes in general involves the reaction of polymers bearing terminal hydroxyl groups, e.g., polyethers, polyesters, polyacetals, polylactones, polycarbonates, etc., either alone or in admixture with chain extenders, with polyisocyanates, in particular diisocyanates. Methods for carrying out these reactions have been detailed in numerous scientific publications and patent specifications.

Although a large number of polyurethanes and methods for their preparation are known, a tremendous amount of research is still directed to the investigation of novel compositions with properties more advantageous for the myriad of uses which might be envisaged, as well as to methods for the preparation thereof.

Polyurethanes prepared through the use of cyclohexane-diisocyanate are known. Thus, the German DT-OS No. 1,955,725 describes such polyurethanes and methods for their preparation. However, the cyclohexane-1,4-diisocyanate employed therein contains at most 85.5% of the trans-isomer, and so the thus-prepared compounds do not exhibit the advantageous properties of the compounds of the instant invention.

The preparation of polyurethanes using the trans-isomer of cyclohexane-1,4-diisocyanate in practically pure form has been described by A. G. Kozhevov and co-workers in Vyskomol, soyed A14 Nr. 3, 662–668 (1972). The primary focus of this scientific article is the kinetic behavior of the corresponding mono- and diisocyanates with respect to reaction with alcohols; the polyurethane products of the therein-described reaction of trans-cyclohexane-1,4-diisocyanate and 1,4-butanediol are of virtually no technological value, as they are of a comparatively low molecular weight and are readily soluble in many customary solvents such as acetone and methanol. They are thus totally unsuitable for use in e.g., the manufacture of molded bodies.

SUMMARY OF THE INVENTION

It is therefore an object of the invention to prepare polyurethane valuable for a variety of uses, which are characterized especially by high softening temperatures, low glass transition temperatures, a high stress capacity in particular in the lower extension range, a high degree of hardness and abrasion tolerance as well as stability with respect to light and to a great number of solvents.

A further object of the invention is to provide methods for the preparation of these polyurethanes.

A still further object of the invention is to provide methods for using these polyurethanes so as to take the fullest advantage of their outstanding properties.

These objects are achieved through the polyurethanes, as well as methods for their preparation and use, described below and in particular as defined in the appended claims.

The cyclohexane-1,4-diisocyanate employed for the preparation of the novel polyurethanes has a high content of the trans-isomer, which should at a minimum be about 90%. It is propitious if the trans component reaches 95%, and preferably 99%. In fact, it is most advantageous if the cyclohexane-1,4-diisocyanate is essentially completely in the form of the trans-isomer; i.e., the component of cis-isomer is virtually zero, or so small that it can for all practical purposes be disregarded.

The preparation of the trans-cyclohexane-1,4-diisocyanate may be effected in a particularly simple manner by the process described in the German patent application No. P 27 10 595.9 of Nov. 3, 1977. A particularly advantageous embodiment of the invention therefore lies in the use of trans-cyclohexane-1,4-diisocyanate obtained by a method described in that patent application for the preparation of the inventive polyurethanes. Exemplary procedures for the preparation of the trans-cyclohexane-1,4-diisocyanate are detailed in Examples 21–25 of the above-noted German application.

As the cyclohexane-diisocyanate reacts readily with compounds bearing labile hydrogens, it should be stored under conditions guaranteeing exclusion of moisture.

Suitable macrodiols for the preparation of the inventive polyurethanes are those macrodiols, i.e., polymers with two hydroxyl groups, in which preferably the hydroxyls are in terminal positions. As examples may be mentioned, inter alia, polyesters, polyethers, polyacetals, polylactones, and polycarbonates. Particularly suitable polyesters include polybutylene adipate and polyethylene adipate; of the polyethers, polytetramethylene glycol is outstanding for the present purposes.

Of particular suitability are those polyesters which do not crystallize at room temperature; most desirable are polyesters based on adipic acid and 2,2,4-trimethyl-1,6-hexanediol, as well as mixed polyesters, in which a variety of glycols may be employed in conjunction with adipic acid. In this regard, it has been found to be advantageous if the glycol mixture contains both straight-chain and branched, or short- and long-chain, glycols. The distinction between short- and long-chain glycols is of course determined contextually; glycols with 2 to 4 or even up to 6 carbon atoms may be considered as short-chained, while glycols with more than 6 carbon atoms would be considered long-chained.

To a certain extent, the macrodiols can be mixed with trifunctional compounds as well, such as polyesters, the alcohol components of which are triols, e.g., trimethylolpropane. In addition, mixtures of the various types of macrodiols, suh as polyesters and polyethers, may also be employed. In any case, the molecular weight of the macrodiols may be determined by conventional methods, such as determination of the OH-number.

In contradistinction to the macromolecular diol components, the chain extenders are to be understood as lower molecular, non-polymeric compounds with at least two active hydrogen atoms which will react with the isocyanate groups. As examples may be mentioned such aliphatic glycols as ethylene glycol, 1,4-butanediol, 2,3-butanediol, 2,5-hexanediol, 2,5-dimethyl-2,5-hexandiol, 1,2- and 1,3-propanediol and 1,5-pentanediol; aromatic compounds such as hydroquinone; and aliphatic, cycloaliphatic and aromatic amines, such as ethylenediamine, hexamethylenediamine, phenylenediamine, 3,3'-dichloro-4,4'-diaminodiphenylmethane, and diaminocyclohexane. Particularly suitable as well as hydrazine and hydrazine derivatives with in each case at least one labile hydrogen on each of the nitrogen atoms. The chain extension may also be effected with water.

The chain extenders may be employed singly or in mixtures. While those with two liable hydrogen atoms are preferred, trifunctional compounds may also be employed at least in part in place of the bifunctional chain extenders. As examples may be noted trimethylolpropane, glycerine, etc.

The preparation of the inventive polyurethanes may be accomplished through per se known methods familiar in the art of polyurethane chemistry. The reaction may be carried out in a solvent such as dimethylformamide or dimethylacetamide, to which may be added solvation mediators, e.g., salts such as lithium chloride. The macrodiol, for example polyethylene adipate, is then reacted with diisocyanate to form an NCO-end group preadduct; by addition of the lower molecular chain extender, the reaction is brought to a conclusion. It is, however, also possible to prepare the inventive polyurethanes by means of a so-called "one-pot" process. The inventive polyurethanes may also be prepared as a melt.

The inventive polyurethanes exhibit outstanding properties in a number of different respects. They have very high softening temperatures while simultaneously exhibiting low freezing and/or glass transition temperatures. With reference to the prior art polyurethanes, they also show a remarkable degree of hardness and abrasion resistance. Of particular practical significance is the fact that these valuable properties are retained over a wide temperature range: the inventive polyurethanes exhibit virtually constant hardness properties within the range between room temperature to over 200° C.

Further advantages of the inventive polyurethanes are their stability with respect to light and to many customary solvents, such as methanol, oils, fuels, and others. Nor are they damaged by liquids as customarily used in hydraulic systems. In addition, their high stress capacity, in particular in the lower extension ranges, as well as their high initial modulus of elasticity, are of particular importance.

Through skillful choice of the starting materials, one may prepare polyurethanes with the most divergent chemical and physical property profiles. This may be effected by the choice of macrodiol, e.g., polyester or polyether or a mixture of the two, as well as by the choice of the chain extender. In addition, the use of other diisocyanates, such as diphenylmethane-4,4'-diisocyanate, dicyclohexylmethane-4,4'-diisocyanate, hexamethyleneisocyanate, toluylenediisocyanate, etc., in addition to the trans-cyclohexane-1,4-diisocyanate allows for the preparation of modified polyurethanes.

On account of their outstanding chemical and physical properties, and the wide range of possible variations, the polyurethanes of the invention may find use in the most diverse types of products. Thus, they may be employed in the preparation of machine parts, automobile components, tires, joints, insulating materials, foams, lacquers or varnishes, coatings, pipes, containers, fibers, threads, yarns, films, etc. Because of their tolerance to hydraulic liquids, the polyurethanes are also of particular suitability for use in the production of hydraulic elements, for example, in the construction of pumps, armatures and valves, as raw material for conduits, hoses, tubes, by-passes, joints, and in many other similar components.

A still further field of use of the inventive compounds is in the manufacture of molded bodies, for which customary methods may be employed. The use of the inventive polyurethanes in the manufacture of molded items is particularly propitious, in that the polyurethane mass undergoes virtually no shrinkage in the forms or molds. The inventive polyurethanes are thus clearly distinguishable in this respect from the prior art compositions customarily employed, such as those prepared from diphenylmethane-4,4'-diisocyanate or other diisocyanates.

The inventive polyurethanes are also of exceptional utility in the manufacture of injection molded items, as in the use of this method as well, the polyurethane suffers practically no shrinkage in the form or mold. The polyurethanes may be employed in the various per se known methods for injection molding, in which one, for example, presses a melt of the polyurethane into the corresponding form by means of an injection mold installation.

For the preparation of injection mold bodies, a melt of the prepared polyurethanes may be employed; that is, one uses products which have already completely reacted. This type of injection molding process, in which the inventive polyurethanes may be used, if desired, in combination with customary additives or with other polyurethanes which serve as thinners or extenders, and which thus employs prepared mixtures, is commonly referred to as LIM-process (Liquid Injection Molding). The inventive polyurethanes, however, are also extremely useful in another type of process, namely, the so-called RIM-process (Reaction Injection Molding). In this type of reaction process, the conversion of the starting materials into the urethane takes place in part in the form, and in part during the injection molding.

In this method, the starting materials may be mixed shortly before the injection molding and then worked up in the conventional manner to the finished product. The mass, which has been pressed in the form, is still in a reactive state; it is then thermally treated for an interval of time sufficient to allow the individual components to thoroughly react. This type of method may also comprise the preparation of a prepolymer of the macrodiol and the diisocyanate, to which the chain extender is subsequently added and the still-reactive mass then worked up into final form. A still further possibility, with the use of separate storage bins and individual dosing devices for each of the components, involves extrusion with a single mold. With any of the procedures, as well as with the LIM-processes, there is virtually no shrinkage in the mold.

The above-described injection mold processes are particularly well-suited for the production of tires for automobiles. Of course, other types of articles may also be prepared according to these methods.

Molding processes, in which a still reactive melt is pressed in the mold, can also be used in conventional casting-type processes, in which the goods are delivered to the form without the use of substantial pressures.

Although in principal all of the inventive polyurethanes can be used for the manufacture of threads and films according to the conventional methods, it has been determined that those polyurethanes are particularly well-suited for this purpose which are prepared from diamines, hydrazine and hydrazine derivatives having a labile hydrogen on each of the nitrogen atoms. In amidic solvents these polyurethanes form particularly stable solutions, which can then be used according to the customary methods for preparation of threads, e.g., wet or dry spinning, or of films, such as pouring followed by drying or coagulation.

The novel features which are considered as characteristic for the invention are set forth in particular in the appended claims. The invention itself, however, together with additional objects and advantages thereof, will be best understood from the following description of specific embodiments.

DESCRIPTION OF THE PREFERRED EMBODIMENTS

EXAMPLE 1

1 Mol of dry polybutylene adipate (molecular weight ca. 2,000) is dissolved in dimethylformamide at about 90° C. The amount of solvent is such that the concentration of the prepared polyurethane approaches 20 weight-%. 2 Mol of 1,4-butanediol is then added, along with dibutyl tin laurate of catalyst. Subsequently, 96% of 3 Mol of trans-cyclohexane-1,4-diisocyanate is added to the solution; the remaining 4% is added over a period of a few hours to complete the reaction. The termination of the reaction may be determined by monitoring the viscosity of the reaction mixture.

The product is worked up to a film by scraping on a glass plate. The solvent is removed by evaporation at about 100° C.

The thus-prepared film exhibits the properties given in the first column of Table 1. In columns 2 and 3, the properties of films prepared in a similar manner are given from polyurethanes based on similar starting materials but with diphenylmethane-4,4'-diisocyanate and dicyclohexylmethane-4,4'-diisocyanate as the diisocyanate component, respectively.

TABLE I

|  | Example 1 Polyurethane based on trans-cyclohexane-1,4-diisocyanate | Comparison Polyurethane based on diphenylmethane-diisocyanate | Comparison Polyurethane based on dicyclohexylmethane-diisocyanate |
|---|---|---|---|
| Softening point (°C.) | 226 | 152 | 122 |
| Strain during 50% extension (daN/mm$^2$) | 0.80 | 0.35 | 0.45 |
| during 100% extension | 1.06 | 0.43 | 0.56 |
| Initial Modulus corresponding to 100% extension (daN/mm$^2$) | 3.83 | 1.70 | 3.52 |
| Glass transition temperature (°C.) | −50 | −45.5 | −49.5 |
| Shore hardness A | 97 | 94 | 90 |
| Shore hardness D | 45 | 41 | 31 |

EXAMPLE 2

By analogy to Example 1, a polyurethane is prepared, with the sole difference, that instead of the polyester a polyether, namely, polytetramethylene glycol, is used, with a molecular weight of approximately 2000.

The properties of the thus-obtained polyurethane film are given in Table II; the comparison compositions differ only in the diisocyanate component.

TABLE II

|  | Example 2 Polyurethane based on trans-cyclohexane-1,4-diisocyanate | Comparison Polyurethane based on diphenylmethylene-diisocyanate | Comparison Polyurethane based on dicyclohexylmethylene-diisocyanate |
|---|---|---|---|
| softening Point (°C.) | 152 (decomp.) | 162 | 127 |
| Strain during 50% extension | 0.67 | 0.32 | 0.32 |
| 100% extension | 0.81 | 0.40 | 0.43 |
| Initial modulus | 3.85 | 1.21 | 1.19 |
| Shore hardness A | 96 | 84 | 86 |
| Shore hardness D | 39 | 25 | 25 |

EXAMPLE 3

From a polyesterdiol based on adipic acid and 2,2,4-trimethyl-1,6-hexanediol and trans-cyclohexane-1,4-diisocyanate a preadduct with an NCO-group is prepared as a melt at about 80° C. This preadduct is then dissolved in dimethylformamide at room temperature. Finally, an equivalent amount of 1,4-butanediol is added. The mixture is kept at 90° C. with stirring.

From the thus-obtained solution a film is prepared by casting on a glass plate and the solvent removed by evaporation.

The film exhibits excellent strength properties, in particular a high initial modulus and exceptional hardness. It is further distinguished through excellent elastic properties and a high breaking tension.

EXAMPLES 4a–c

These examples concern the production of melt-cast molded bodies. To, in each case, 1 Mol of polybutylene adipate with a molecular weight of about 2000, 2, 3 or 4 Mol trans-cyclohexane-1,4-diisocyanate is added to form the prepolymer as a melt. After determining the NCO-content, an equivalent amount of 1,3-propanediol is stirred in; after a brief period of intensive stirring, the mixture is evacuated of gas and air by application of a vacuum to it and then immediately cast in the form. The products are then subjected to a thermal treatment for a number of hours at about 140° C. The thus-obtained molded bodies exhibit virtually no shrinkage. The properties of these products are given in Table III.

TABLE III

| Example | 4a | 4b | 4c |
|---|---|---|---|
| Mol CHDI | 2 | 3 | 4 |
| Strain during 100% extension | 0.82 | 1.07 | 1.49 |
| during 300% extension | 1.07 | 1.45 | 2.00 |
| Fracture extension | 750 | 525 | 370 |

TABLE III-continued

| Example | 4a | 4b | 4c |
|---|---|---|---|
| Shore hardness | 45 | 45 | 50 |

EXAMPLE 5

This example relates to the preparation of injection molded products. From a polyurethane prepared according to Example 4a, a test bar is prepared at about 210° C. using a conventional injection mold apparatus for the investigation of its mechanical properties. The test bar shows no shrinkage in the injection mold form. The test body is superior to those prepared from prior art polyurethanes in its excellent flow properties as well as in its exceptional mechanical properties such as high hardness (Shore hardness D 42), strain during 100% extension (0.71 daN/mm$^2$) and fracture extension (715%).

EXAMPLE 6

From 1 Mol of a commercially mixed polyester based on adipic acid and a glycol mixture (Elastophen 2024 of the firm Elastogran Polyurethan-Chemie CmbH und Co. K.G., Osnabrück) and 2 Mol trans-cyclohexane-1,4-diisocyanate, a preadduct is form as a melt at 120° C. in about 2 hours. This is dissolved in dimethylacetamide containing 2% lithium chloride to form a 15% solution. Thereto is added 1 Mol of a 2% hydrazine hydrate solution in dimethylacetamide. There is obtained a stable solution with a viscosity of about 200 poise. Using water as precipitating bath, this solution is formed into fibers through extrusion through spinning nozzles. In addition to excellent mechanical properties, these fibers are exceptional in their stability with respect to light.

Moreover, after 20 days of treatment of these fibers in a Xenotest apparatus (24° C., 75% relative humidity), the fibers still retain 95% of their initial strength, whereas fibers prepared from an analogous polyurethane, which is prepared from diphenylmethane-4,4'-diisocyanate instead of trans-cyclohexane-1,4-diisocyanate, disintegrate after only about 3 days.

In all of the above examples, the trans-cyclohexane-1,4-diisocyanate is prepared according to the teachings of the German Patent application No. P 27 10 595.9 of Nov. 13, 1977.

It will be understood that each of the polyurethane compositions described above, or two or more together, may also find a useful application in other types of uses differing from the types described above.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Polyurethanes obtained through the reaction of macrodiols with a molecular weight between about 800 and 4000, cyclohexane-1,4-diisocyanate with a trans-isomer content of at least 90% based on the total cyclohexane-1,4-diisocyanate, and lower molecular chain extenders with at least two labile hydrogens.
2. A polyurethane as defined in claim 1, wherein the trans-isomer content is at least 95%.
3. A polyurethane as defined in claim 1, wherein the trans-isomer content is at least 99%.
4. A polyurethane as defined in claim 1, wherein the cyclohexane-1,4-diisocyanate is essentially pure trans-isomer.
5. A polyurethane as defined in claim 1, wherein said macrodial is polybutylene adipate and said chain extender is an aliphatic glycol with 2 to 4 carbon atoms.
6. A polyurethane as defined in claim 1, wherein said macrodiol is a polyester which does not crystallize at room temperature.
7. A polyurethane as defined in claim 1, wherein said macrodiol is poly-2,2,4-trimethyl-1,6-hexylene adipate and said chain extender is an aliphatic glycol with 2 to 4 carbon atoms.
8. A polyurethane as defined in claim 1, wherein said macrodiol is polytetramethylene glycol and said chain extender is an aliphatic glycol with 2 to 4 carbon atoms.
9. A polyurethane as defined in claim 1, wherein said chain extender is hydrazine.
10. A polyurethane as defined in claim 1, wherein said chain extender is a diamine.
11. A process for the preparation of polyurethanes, comprising reacting a macrodiol with a molecular weight between about 800 and 4000, a low molecular weight chain extender with at least two labile hydrogens, and cyclohexane-1,4-diisocyanate with a trans-isomer content of at least 90% based on the total cyclohexane-1,4-diisocyanate.
12. A process as defined in claim 11, wherein said trans-isomer content is at least 95%.
13. A process as defined in claim 11, wherein said trans-isomer content is at least 99%.
14. A process as defined in claim 11, wherein said cyclohexane-1,4-diisocyanate is essentially pure trans-isomer.
15. A process as defined in claim 11, wherein said macrodiol is a polyester.
16. A process as defined in claim 15, wherein said polyester does not crystallize at room temperature.
17. A process as defined in claim 11, wherein said macrodiol is a mixed polyester based on adipic acid, short chain aliphatic glycols of 2 to about 6 carbon atoms, and longer chain glycols with between about 6 to 10 carbon atoms.
18. A process as defined in claim 17, wherein said mixed polyester is based on adipic acid and branched and unbranched glycols.
19. A process as defined in claim 11, wherein said macrodiol is a polyester based on alipic acid and 2,2,4-trimethyl-1,6-hexanediol.
20. A process as defined in claim 11, wherein said macrodiol is a polyester based on polybutylene adipate.
21. A process as defined in claim 11, wherein said macrodiol is polytetramethylene glycol.
22. A process as defined in claim 11, wherein said chain extender is 1,4-butanediol.
23. A process as defined in claim 11, wherein said chain extender is hydrazine.
24. A process as defined in claim 11, wherein said chain extender is an aliphatic diamine with two to six carbon atoms.
25. A process as defined in claim 11, wherein said chain extender is a cycloaliphatic diamine.
26. A process as defined in claim 25, wherein said cycloaliphatic diamine is trans-cyclohexane-1,4-diamine.
27. A method of using the polyurethanes of claim 1 for the manufacture of injection molded articles.
28. A method as defined in claim 27, wherein said articles are automobile tires.
29. A method of using the polyurethanes of claims 9 and 10 for the production of fibers and films.

* * * * *